United States Patent

[11] 3,610,661

| [72] | Inventors | Dwight E. Pierce;<br>Ted W. Pierce, both of Stratton, Nebr. |
|---|---|---|
| [21] | Appl. No. | 844,413 |
| [22] | Filed | July 24, 1969 |
| [45] | Patented | Oct. 5, 1971 |
| [73] | Assignee | Miller Weeder Company Inc.<br>Stratton, Nebr. |

[54] AUXILIARY WHEELED FRAME FOR WHEEL-MOUNTED IMPLEMENTS
3 Claims, 11 Drawing Figs.

[52] U.S. Cl. ............................................. 280/415 R,
56/228, 172/240, 172/248, 280/150.5, 280/411 A
[51] Int. Cl. ............................................. A01d 75/22
[50] Field of Search ................................. 280/411 B,
411 A, 400, 415, 34, 34 A, 80, 150 A, 43, 150.5;
172/240, 248; 56/228; 287/3, 14, 91

[56] References Cited
UNITED STATES PATENTS

| 2,696,772 | 12/1954 | Underdown | 172/240 X |
| 2,900,031 | 8/1959 | Sorensen et al. | 172/240 X |
| 3,240,005 | 3/1966 | Rowse | 56/228 X |
| 3,460,630 | 8/1969 | Richey | 172/240 |
| 3,511,318 | 5/1970 | Boetto et al. | 172/240 |
| 3,515,408 | 6/1970 | Cagle | 280/415 |

Primary Examiner—Benjamin Hersh
Assistant Examiner—Leslie J. Paperner
Attorney—Anderson, Spangler & Wymore ABSTRACT: This invention relates to an auxiliary wheeled frame fastenable to the main frame of a tractor-drawn farm implement of the type having a caster wheel so as to cooperate therewith to define a wheeled assembly capable of being towed endwise along a highway or other thoroughfare in contrast to its sidewise movement through a field. The wheel of the auxiliary frame is movable to an inoperative position for field use of the implement and each frame is hingedly connectable to other similar frames to form a train thereof movable both endwise and sidewise.

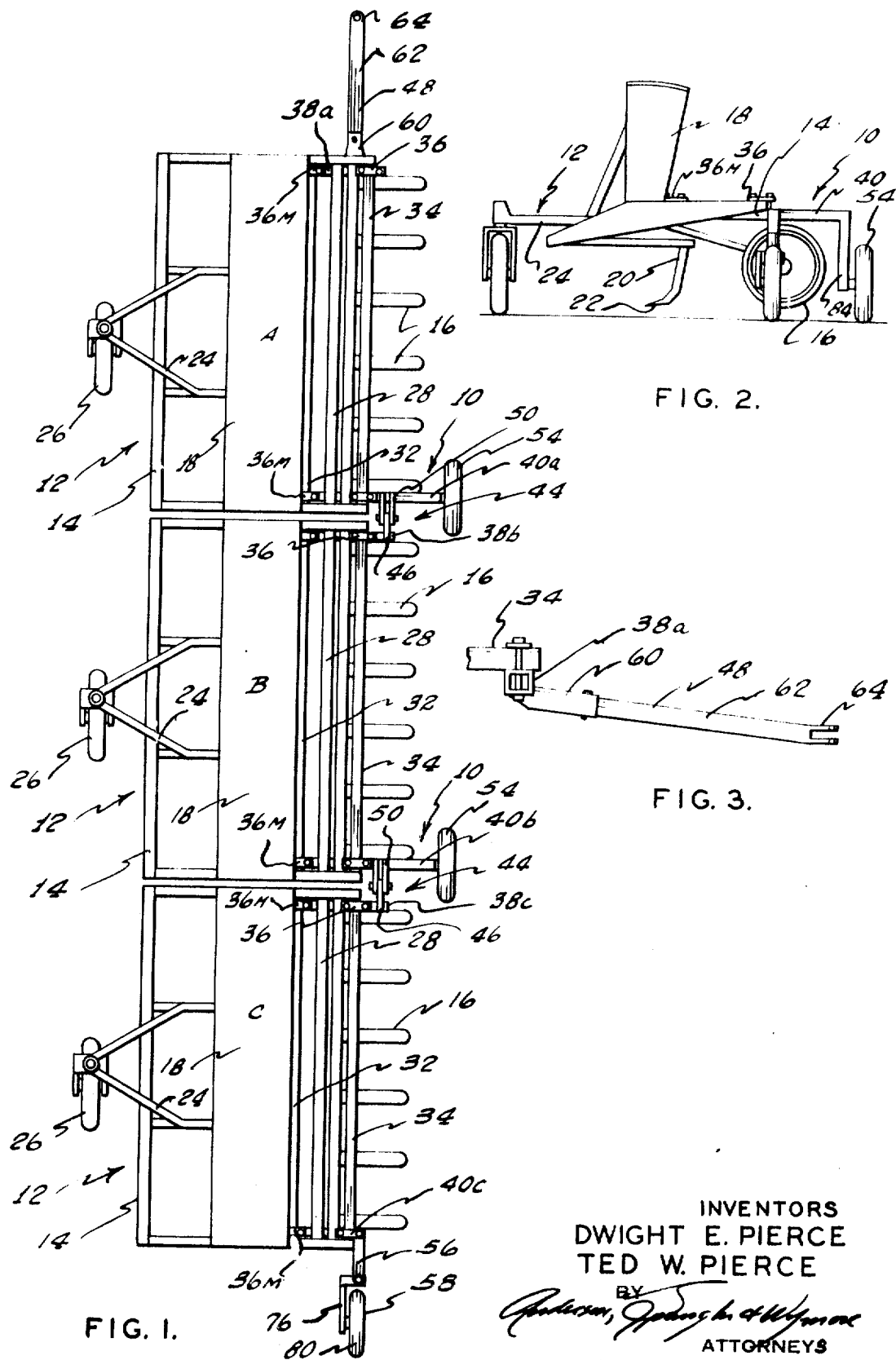

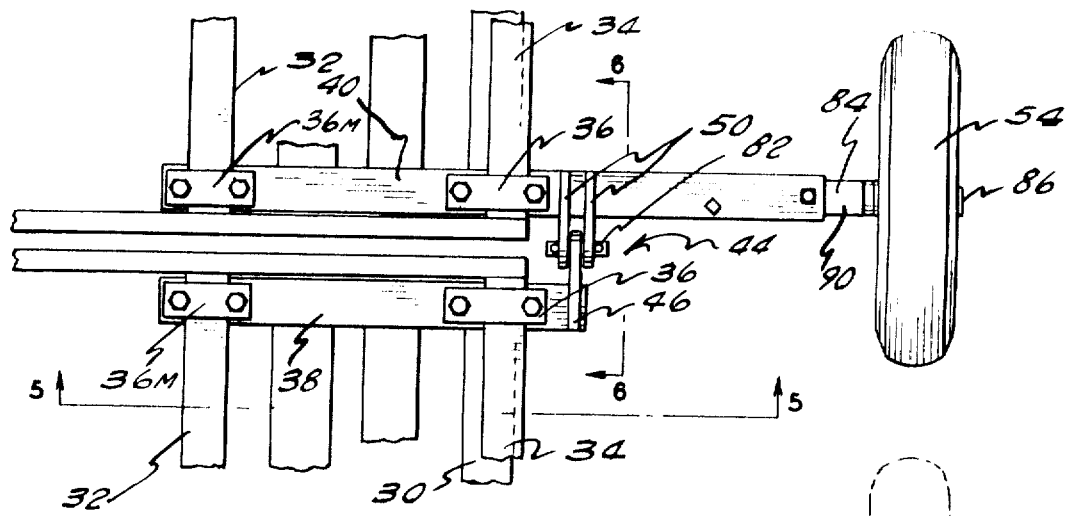
FIG. 4.
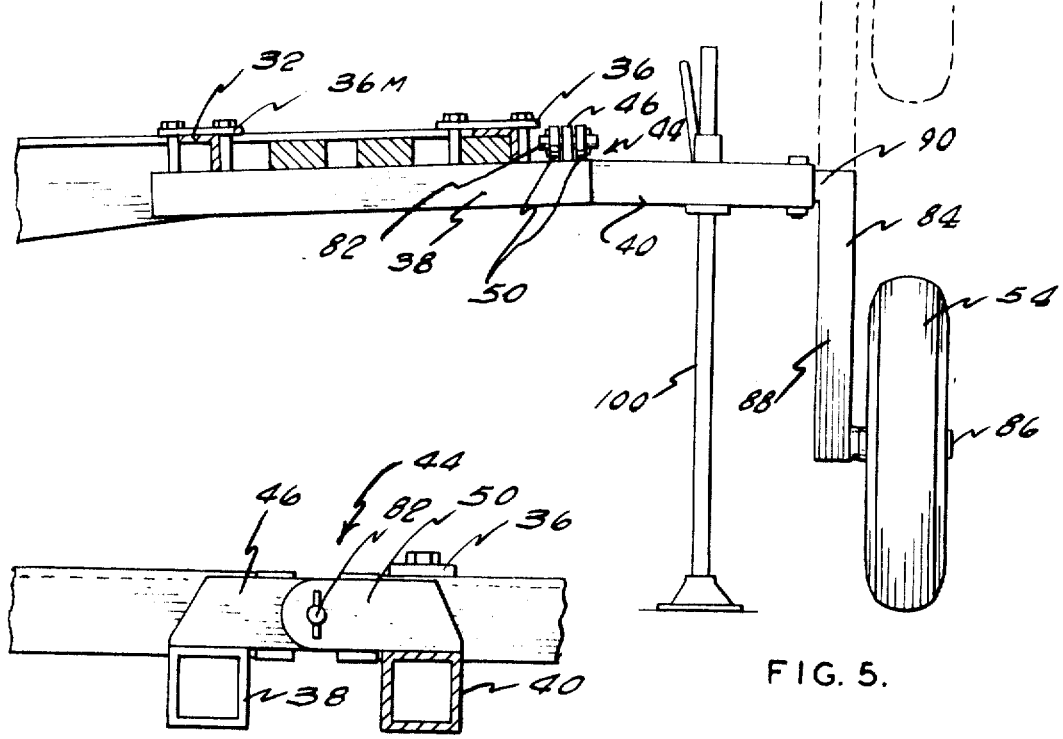
FIG. 6.
FIG. 5.
INVENTORS
DWIGHT E. PIERCE
TED W. PIERCE
ATTORNEYS

INVENTORS
DWIGHT E. PIERCE
TED W. PIERCE

ATTORNEYS

AUXILIARY WHEELED FRAME FOR WHEEL-MOUNTED IMPLEMENTS

Many farm implements are a good deal wider than they are long in order to till, cultivate or harvest as wide a swath as possible in a field. In fact, with a large heavy-duty tractor available, it is often possible to "gang" two or more like implements in end-to-end relation for sidewise movement through a field so as to multiply the area worked on each pass by a factor of two or more. A problem arises, however, in moving such an implement or group thereof from field to field.

Occasionally single implements are 16 feet wide or wider and they thus become difficult and hazardous to move along the highway for even a short distance to say nothing of the fact that to do so usually violates state traffic laws governing the maximum width of vehicles. While it is not uncommon to find such implements being towed or otherwise transported over on the shoulder of the road, the practice remains illegal and is only slightly less hazardous than moving along the main part of the highway.

In the case of "ganged" implements, generally the only solution is to uncouple the several units and transport them one at a time to the next field. This, obviously, is a troublesome and time-consuming operation that would be well to avoid.

One solution to the problem is to move the individual units or a train thereof endwise along a highway so as to take advantage of their lesser front-to-rear dimension in contrast to their width. With most farm implements designed to move in only one direction and that at right angles to their maximum horizontal dimension, a trailer or other wheeled unit capable of lifting the implement wheels free of the ground is about the only answer left.

Other farm implements have caster-type wheels which, due to their swivel action, leave the implement free to move in any direction; however, in many instances only one such wheel is used or, if more than one, they are often arranged in a single line so that they cooperate with the tractor wheels to support the implement but are, sometimes, incapable of doing so alone. It is to this type of caster-wheeled farm implement that the present invention relates.

One of the most common farm implements of this type is the grain drill which has a rather wide main frame usually equipped with a single caster-type wheel projecting out in front in centered position and a row of so-called "packer wheels" mounted along the rear edge for rotation about a common transverse axis in spaced-parallel relation to one another. These wheels cooperate to both support the unit and allow same to be turned, however, they obviously will not permit it to be moved endwise in the direction of the packer wheels common axis unless said packer wheels are lifted free of the ground and another wheel substituted therefor with its axis at right angles thereto so as to support the rear end of the unit for such endwise movement.

It has now been found in accordance with the teaching of the instant invention that units of this type can be simply and easily connected from sidewise to endwise movement, whether alone or in end-to-end ganged relation, by equipping same with an auxiliary frame carrying a wheel along the rear edge that in its lowered operative position raises the packer wheels free of the ground while cooperating with the existing caster wheel to define a two-wheeled trailer. A tongue is provided on side of the unit that becomes the front end when moving in the endwise mode. If more than one unit is employed in tandem or otherwise "ganged" relation, each is hingedly connected to the unit or units on each side thereof so as to form a train when moving endwise. The wheel of the auxiliary frame swings up out of the way into an inoperative position when the implement is in its sidewise or "field" mode as opposed to its "highway" mode. When three or more units are "ganged," somewhat better tracking is achieved when a trailing caster wheel is used on the last unit in the train in place of the sidewheel on the units forwardly thereof.

It is, therefore, the principal object of the present invention to provide a novel and improved auxiliary wheeled frame for farm implements already equipped with at least one caster wheel that cooperates therewith to permit said implement to be towed endwise.

A second objective of the invention herein disclosed and claimed is to provide a unit of the class described that remains a permanent part of the implement so equipped.

Another object is to provide a wheeled auxiliary frame that cooperates with the caster wheel on the implement to define a two-wheeled trailer.

Still another objective is to provide an auxiliary frame which can be hingedly connected to another similar unit to form a chain thereof.

An additional objective is to provide a wheeled frame wherein one of the wheels can be raised out of the way and rendered inoperative for field use.

Further objects of the invention are the provision of a highway travel conversion unit for farm implements and the like that is simple to mount, rugged, relatively inexpensive, versatile and that does not interfere in any way with normal use of the implement. Other objects will be in part apparent and in part pointed out specifically hereinafter in connection with the description of the drawings that follows, and in which:

FIG. 1 is a top plan view showing three identical drills arranged in side-by-side relation and equipped with the auxiliary wheeled frames of the present invention converting same for endwise travel in "highway" mode;

FIG. 2 is a rear end elevation of the train of units;

FIG. 3 is a fragmentary side elevation to a slightly enlarged scale showing the tongue or drawbar with which the front unit is equipped;

FIG. 4 is a fragmentary top plan view to a further enlarged scale showing the hinged connection between the auxiliary frames and the side wheel;

FIG. 5 is a fragmentary section taken along line 5—5 of FIG. 4;

FIG. 6 is a fragmentary section to a still further enlarged scale taken along line 6—6 of FIG. 4;

Figure 10:
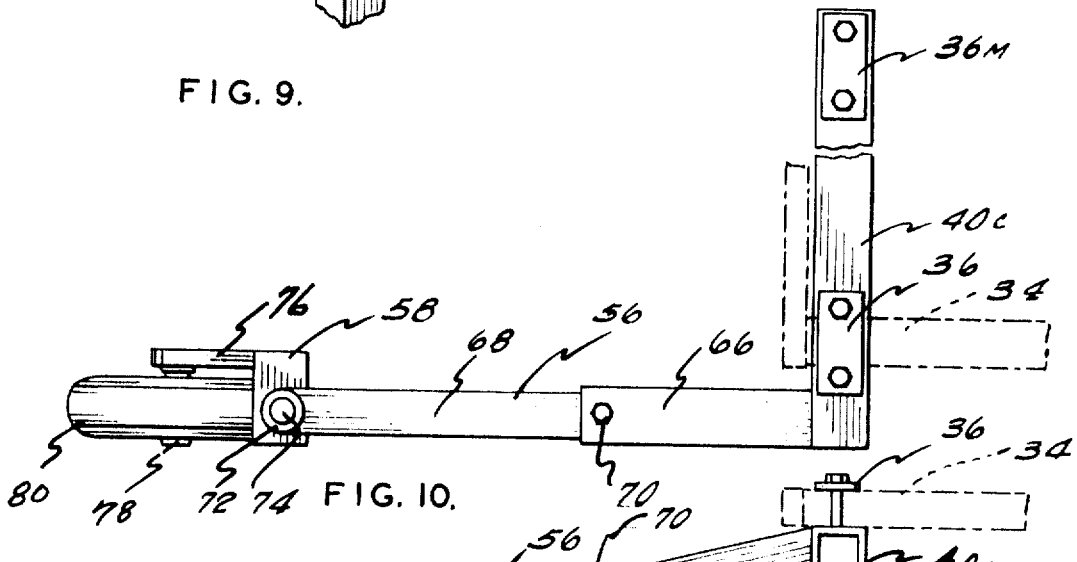
Figure 11:
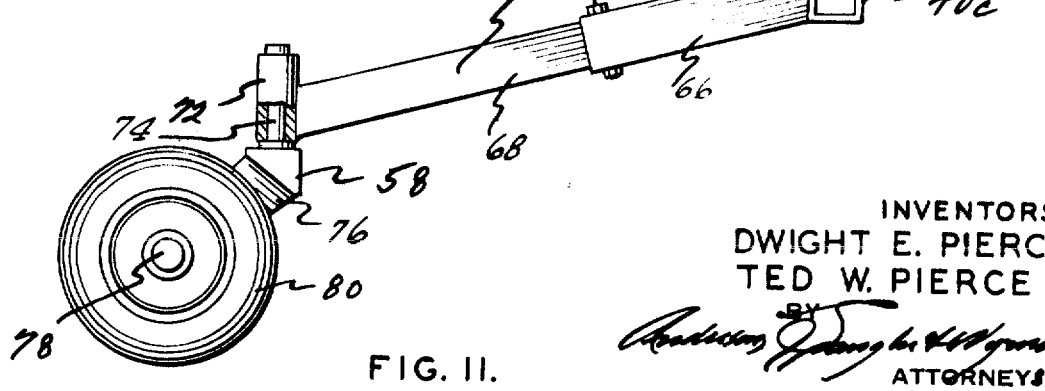

FIG. 10 is a fragmentary top plan view showing the trailing wheel subassembly; and FIG. 11 is a fragmentary side elevation of the trailing wheel subassembly showing a portion of the bearing member broken away. Referring now to the drawings for a detailed description of the present invention and, initially, to FIGS. 1 and 2 for this purpose, reference numeral 10 has been chosen to broadly designate the auxiliary implement frame in its entirety and numeral 12 to similarly denote the farm implement to which it is attached. Implement 12, in the particular form shown, comprises a conventional press grain drill of the type having a main frame 14 of generally rectangular configuration along the rear edge of which is mounted a series of press or packer wheels 16 for rotation in spaced-parallel relation about a common axis extending from end to end thereof. These wheels are shown to be of the pneumatic type but they are commonly also of the metal-lined variety. Atop the main frame sits a grain box or hopper 18 which, when filled with grain, feeds same by gravity into tubular "lister openers" 20 carrying shovels 22 on their lower ends that plow shallow seed furrows as the implement is towed sidewise through a field behind a tractor.

A yoke 24 projects forwardly from the middle of the main frame and a caster wheel 26 is mounted at the apex of the latter. This caster wheel cooperates with the press wheels along the rear edge of the frame to maintain the shovels in their preset adjusted positions below ground level.

No attempt has been made to illustrate all the details of the press drill because they are insignificant to the present invention which comprises an auxiliary wheeled frame 10 cooperating with the existing implement frame 14 and caster wheel 26 to lift the press wheels 16 free of the ground while permitting endwise movement of the unit. As such, the press drill illustrated herein becomes merely representative of a class of farm implements and the like having wheeled frames convertible from sidewise to endwise movement through the addition of the auxiliary frame forming the subject matter hereof.

With particular reference now to FIGS. 1, 4, 5 and 6, it will be seen that a catwalk 28 extends along the rear of the implement frame behind the hopper and above the forward part of the press wheels. The wooden slot or footboard 30 at the rear edge of the catwalk constitutes an element of the main implement frame and it, together with angle iron 32 located forwardly thereof in spaced-parallel relation define the structural elements to which the auxiliary frame 10 is attached.

A longitudinal auxiliary frame member 34 in the form of an angle iron extends along the rear catwalk slot 30 and is securely attached thereto by bracket subassemblies 36 located at opposite ends thereof. Transverse auxiliary frame members 38 and 40 are fastened permanently to the opposite ends of frame member 34 in position to pass underneath the catwalk and main implement frame member 32 where they are securely attached to the latter by other similar bracket subassemblies 36m modified slightly to accommodate same.

Transverse auxiliary frame elements 38 and 40 are substantially identical to one another insofar as the portion that passes forwardly beneath and is connected to the main frame is concerned; however, the portion thereof that projects rearwardly beyond the catwalk 28 and longitudinal frame element 34 differs considerably with respect to its length, function and hardware carried thereby depending upon which end of the auxiliary frame it is found; whether the auxiliary frame is to be used alone, in tandem or in "ganged" sets of three or more; and what position within said tandem or ganged sets it occupies. For purposes of the present description, frame elements 38 are those which are not long enough or intended to be fitted with a wheel while frame elements 40 are designed to accept same. Even so, elements 38 differ slightly from one another as can be seen from a brief look at FIG. 1 to which reference will, once again, be made.

Frame element 38a at the front end of the forwardmost or lead unit (Unit A) arranged for endwise movement in the so-called "highway mode" as shown in FIG. 1, need carry no part of the hinge coupling that has been designated broadly by reference numeral 44; however, the corresponding elements 38b and 38c in the second and third units (B and C), are somewhat longer so as to accommodate an element 46 of said hinge. Conversely, elements 38b and 38c needn't be equipped with a tongue 48 which is required on element 38a at the front of the forwardmost unit as can be seen in FIG. 3.

The other transverse frame elements 40 are, likewise, slightly different depending upon which of the units in which they are located. In the particular form shown, those frame elements 40a located at the rear ends of the front and middle units (A and B) each carrying the other leaf 50 of hinge 44 and the L-shaped subframe 52 upon which the side wheel 54 is mounted. The transverse frame element 40b at the rear end of the last unit in the train (C in FIG. 1) is shorter than its companion pieces 40a and is adapted to receive the caster-type pivotal mount 56 of trailing wheel subassembly 58 that will be described in detail presently in connection with FIGS. 10 and 11.

FIGS. 1 and 3, to which reference will now be made, show the tongue 48 to comprise a hollow rectangular socket 60 welded to the underside of transverse frame 38a so as to telescopically receive the drawbar 62 that is bolted, pinned or otherwise removably fastened therein. The drawbar has a bifurcated forward end portion 64 adapted for attachment to a conventional tractor hitch.

With similar reference to FIGS. 1, 10 and 11, it will be noted that the mount 56 for trailing caster wheel subassembly 58 is of similar construction to the tongue in that it includes a short rectangular socket section 66 welded to the rearmost transverse element 40c, an arm 68 telescoped into said socket section and detachably secured therein by fastener 70, and an upstanding tubular bearing member 72 on the rear extremity thereof adapted to journal the pin 74 of the caster wheel subassembly for pivotal movement about a vertical axis. The caster wheel subassembly, in addition to pin 74, includes an inverted generally L-shaped offset frame member 76 carrying an axle 78 mounting the wheel 80 for rotation about a horizontal axis in the plane of pin 74. It has been found that the trailing caster wheel just described can be eliminated in trains of one or two units but that it provides better guidance control and tracking where three or more units are ganged for endwise highway travel.

Next, the hinged connection 44 will be described briefly in connection with FIGS. 1, 4, 5 and 6. The hinge is quite simple in that it comprises nothing more than a single hinge leaf 46 fitted loosely between transversely spaced hinge leaves 50 and connected thereto by hinge pin 82. The loose fit permits the units thus hingedly connected to pivot relative to one another about a vertical axis to the degree necessary to turn a corner and also to tilt so as to navigate uneven terrain of the type found in fields and country roads.

Figure 7:
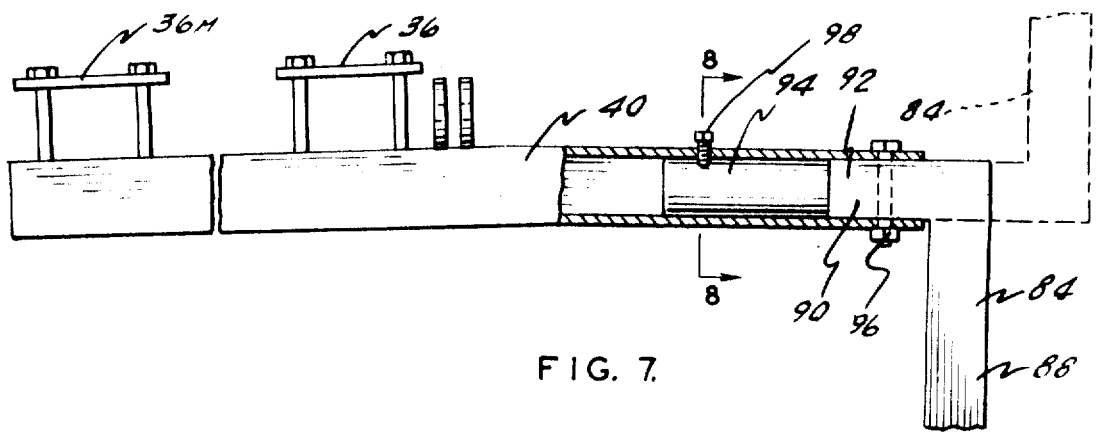
FIG. 7 is a fragmentary section similar to FIG. 5 with the outer portion of the transverse frame member broken away.
Figure 9:
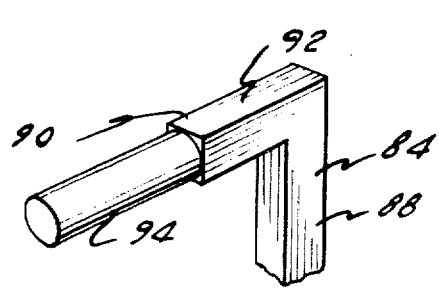
FIG. 9 is a fragmentary perspective view of the upper portion of the side wheel mount.
Figure 8:
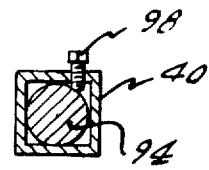
FIG. 8 is a cross section view of the transverse frame number taken along line 8—8 of FIG. 7.

Finally, reference is made to FIGS. 1, 2, 4, 5 and 7-9, inclusive, for the details of the side wheels 54. Elements 40a and 40b of the auxiliary frames A and B differ slightly from element 40c of the trailing unit C in that they are longer and designed to accommodate a side wheel. The mount 84 for the side wheel has a generally Z-shaped configuration including a horizontally disposed axle 86 for the wheel at the lower end of load-bearing portion 88. At the upper end of this load-bearing portion bar 88 paralleling the axle 86 but extending in the opposite direction is a connecting portion 90 that includes both a square section 92 and a cylindrical one 94, both sections of which telescope into the hollow interior of transverse frame member 40. The square section 94 is adjacent the upright and the cylindrical section 94 is remote therefrom so that when the frame is pulled out until the square section is free from the frame element (broken lines in FIG. 7), it may be freely rotated between the full and broken-line positions of FIG. 5 while remaining supported therein by the cylindrical section. Obviously, when the square section is reinserted into the frame element, the wheel and frame are retained in either the broken-line, inoperative position or the full-line, operative one. Fastener 96 passes through registering openings in both the square section and frame member to fasten the frame in either of the aforementioned positions. A second rearwardly offset setscrew-type fastener 98 threads through the frame element in position to engage the cylindrical surface to the rear of center as shown in FIGS. 7 and 8. This tends to pivot the frame a few degrees about fastener 96 thus introducing a little "toe-out" in the side wheel which improves the tracking of the implement train.

When the side wheels rest upon the ground as shown in FIG. 2, they cooperate with the regular implement caster wheels to raise the packer wheels free of the ground. An ordinary jack 100 (FIG. 5) is used to raise the implement and its auxiliary frame up so that the side wheels are free of the ground and can be shifted between their operative and inoperative positions. The side wheels, of course, are stored in their inoperative positions when the unit is in field mode. The trailing caster wheel 58 can either be removed or turned upside down by putting the pin in from the top or, preferably, turning the frame 180°.

What is claimed is:

1. An attachment for converting a tractor-drawn field implement of the type having a caster wheel on one side thereof from sidewise to endwise movement which comprises: an auxiliary frame mountable on the side of the implement opposite that carrying the caster wheel, said frame including a tongue member adapted for attachment to a tractor hitch projecting forwardly from the front end thereof and a transverse frame member having a hollow rectangular cross section at the outer end and extending substantially horizontally across the rear end; a generally Z-shaped wheel mount having oppositely extending spaced substantially parallel end portions interconnected by a rigid load-bearing midportion, the outwardly extending end portion defining an axle and the inwardly extending end portion comprising a connector, of rectangular cross section adjacent the load-bearing midportion thereof and the remote end of said connector of cylindrical cross section, said cylindrical portion being sized and adapted to rotate freely within the rectangular portion of the frame element when the rectangular portion of said mount is withdrawn from the latter, adapted to detachably and telescopically fasten into the transverse frame element in at least two different positions, one of said positions being an operative position wherein a wheel mounted on the axle will cooperate with the caster wheel to support the implement for sidewise rolling engagement over the ground, and another of said positions being an inoperative one in which the wheel mounted on said axle is lifted free of the ground so as to permit sidewise movement of the implement; and, a wheel journaled on the axle for rotation about a transverse substantially horizontal axis.

2. The attachment as set forth in claim 1 in which: a setscrew is threaded into the transverse frame member offset to one side thereof in position to engage the cylindrical connector and urge same tightly against the opposite side.

3. The attachment as set forth in claim 1 in which: the transverse frame element includes aligned fastener openings in opposite faces thereof, the wheel mount connector includes aligned fastener openings in opposite faces thereof positioned to register with the openings in the transverse frame element when said wheel mount is in both its operative and inoperative positions, a fastener passes through said registering sets of aligned openings to removably fasten said wheel mount to said frame member in either of said relative positions, and a setscrew is threaded into the transverse frame member spaced inwardly of said fastener in rearwardly offset relation, said setscrew being positioned to bear against the cylindrical surface of the wheel mount connector and urge same forwardly against the front of the frame member about the fastener as a pivot so as to introduce a few degrees of toe-out in the wheel.